UNITED STATES PATENT OFFICE.

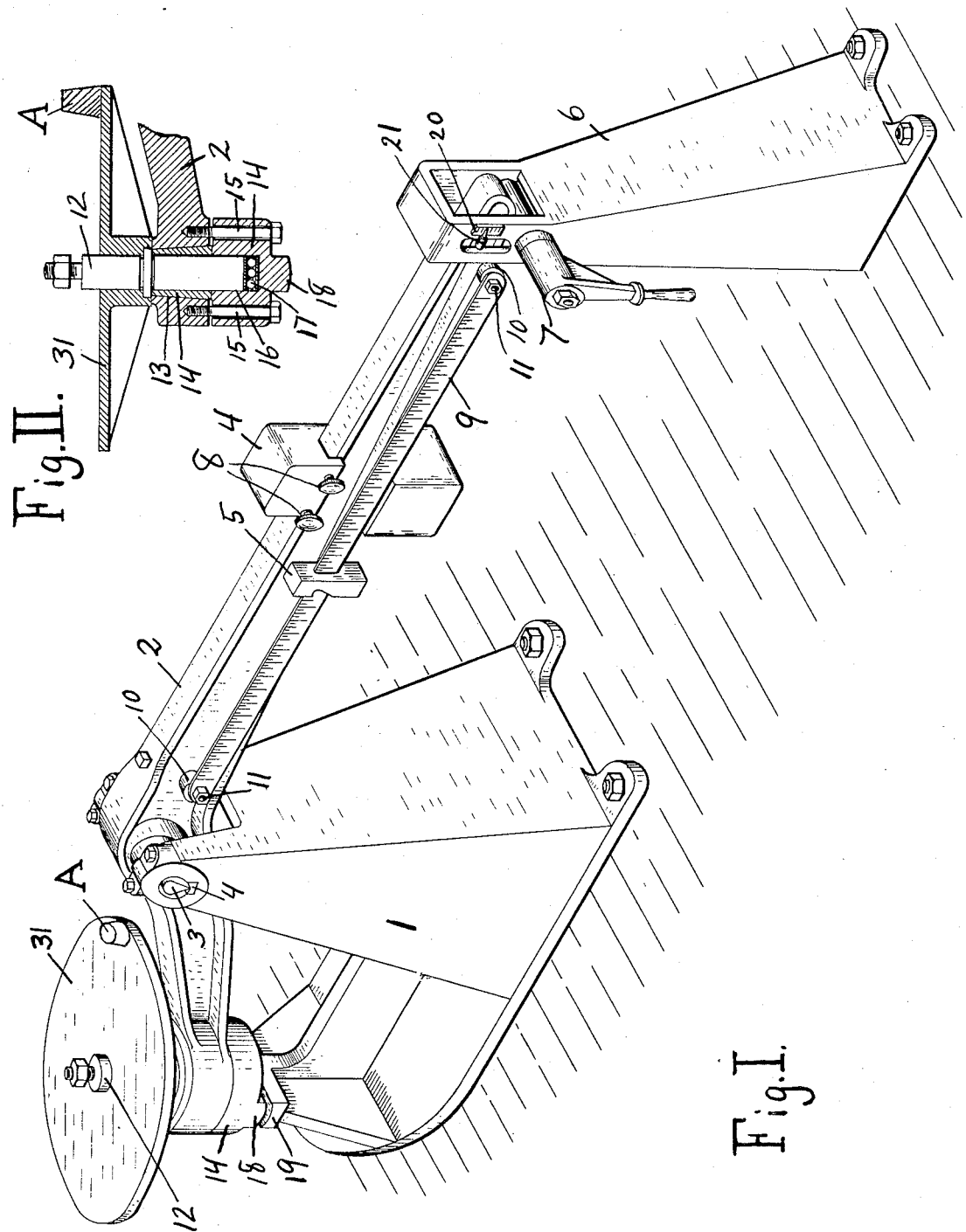

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

BALANCING-MACHINE.

995,109.   Specification of Letters Patent.   Patented June 13, 1911.

Application filed December 17, 1906. Serial No. 348,151.

*To all whom it may concern:*

Be it known that I, NORMAN C. BASSETT, a citizen of the United States, residing at Milwaukee, in the county of Milwaukee and State of Wisconsin, have invented a certain new and useful Balancing-Machine, of which the following is a specification.

This invention relates to balancing machines or apparatus by which the heavy or light side of an object with respect to some axis may be readily determined and the excess in weight of the heavy side over the light side with reference to said axis may be readily measured in common units of measurement, as for example, in units of the ordinary avoirdupois weight, pounds and ounces.

In the drawings which illustrate an embodiment of this invention and on which the same reference characters are used to designate the same elements wherever they are shown in each of the several views,—Figure 1 is a perspective view of a balancing machine embodying this invention; and Fig. 2 is a sectional view of a detail thereof.

The numeral 1 designates a fulcrum member upon which is mounted the lever 2, which is supported upon said fulcrum member in any suitable or preferred way, as, for example, by the knife edge bearings 3 which are supported by the hard V-plates 4.

Carried by one end of the lever 2 is a turntable 31, upon which the article the balance of which is to be determined is placed and carried by the lever, on the opposite side of the knife edge bearings from the turntable are the adjustable weights 4 and 5, the adjustable weight 4 preferably approximating but not equaling in its balancing effect at a predetermined point the weight of the articles the balance of which is to be determined, while the weight 5 is preferably of less weight and adapted to be moved a considerable distance for indicating a difference in weight, whereby the accuracy of its determination is increased.

The numeral 6 designates a pedestal which may be secured to the floor or in a similar convenient location, and this pedestal at its top is provided with an aperture through which the end of the lever 2 projects and within which it is free to move within certain prescribed limits, except when restrained by an ordinary form of scale beam locking member 7.

The weight 4 is slidable along the arm of the lever 2 but can be retained at any position by means of the set screws 8.

The weight 5 is preferably carried upon a separate graduated bar 9 which is secured to lugs 10 upon the lever 2 by means of bolts 11.

The turntable 31 is mounted upon an axis 12 which is projected upwardly through the lever 2, said lever being provided with an aperture 13 adapted to receive a two part bushing 14 secured to said lever by bolts 15, said bushing being provided with a recess 16 within which the axis 12 is adapted to be seated, and between the bottom of this recess and the axis 12, antifriction devices may be placed, as the anitfriction balls 17, for example.

The bottom of this bushing is preferably arranged with a transverse projection 18, the bottom of which is of a rounded contour adapted to register with a concave part of a stop 19, which is shown by the drawings as forming an integral part of a casting of which the fulcrum 1 also forms a part.

The pedestal 6 is preferably provided with a scale 20, adjacent to which a pointer 21 secured to the lever 2 is adapted to move when moved by said lever.

It will be noticed that this balancing machine bears a striking resemblance to an ordinary form of weighing scale. The radical difference between this machine and the weighing scale is readily apparent from an inspection of Fig. 2, from which it will be seen that the turntable is simply a movable part of the lever so that if a weight A were placed in the position shown by Figs. 1 and 2, the effect of such weight would be due to its horizontal distance from the bearing point of the knife edges 3. If, now, the turntable were revolved 180°, the weight will have been moved twice as far from the knife edge bearings 3 as it was from the axis 12.

In the use of this apparatus, the member, as for example, a pulley, the balance of which is to be determined, is placed upon the turntable, and by noting the difference in weight as indicated by the weights 4 and 5 with the article occupying a position in which some part is at the point occupied by the weight A shown by the drawings, and in which this same part occupies a position at 180° therefrom, the exact difference in weight of the heavy side over the light side of said article can be determined.

What I claim is,—

1. The combination of a lever, a fulcrum member for said lever, means supported by said lever to rotate on an axis fixed with respect to said lever and having devices for supporting centrally and rigidly therewith a weight to be investigated, and means for determining the unbalanced force of gravity exerted by said weight on said lever.

2. The combination of a fulcrum member, a lever thereon, means supported by said lever to rotate on an axis fixed with respect thereto, said means having devices for supporting centrally and rigidly therewith a weight to be investigated, and an adjustable balancing weight also supported by said lever.

3. The combination of a fulcrum member, a lever thereon, a turntable adapted to support a weight to be investigated and rigidly coacting with said lever to resist tilting with respect thereto, but said turntable being rotatable with respect to the said lever and supported thereby, and an adjustable balancing weight supported by said lever, said turntable and said balancing weight being on opposite sides of said fulcrum member.

4. The combination of a lever tiltable in a vertical plane, a fulcrum member for said lever, means rotatable on an axis lying in said plane and supported by said lever and having devices for supporting centrally and rigidly therewith a weight to be investigated, and means for determining the unbalanced force of gravity exerted by said weight on said lever.

In testimony whereof, I affix my signature in the presence of two witnesses.

NORMAN C. BASSETT.

Witnesses:
G. F. De Wein,
Frank E. Dennett.